United States Patent
Yang

(10) Patent No.: US 8,680,719 B2
(45) Date of Patent: Mar. 25, 2014

(54) DIRECT CURRENT VOLTAGE SUPPLY APPARATUS

(75) Inventor: Jun-Dong Yang, Shanghai (CN)

(73) Assignee: Inventec Corporation, Taipei (TW)

( * ) Notice: Subject to any disclaimer, the term of this patent is extended or adjusted under 35 U.S.C. 154(b) by 590 days.

(21) Appl. No.: 12/973,928

(22) Filed: Dec. 21, 2010

(65) Prior Publication Data

US 2012/0133350 A1  May 31, 2012

(30) Foreign Application Priority Data

Nov. 30, 2010  (TW) .............................. 99141528 A

(51) Int. Cl.
*H01H 47/00* (2006.01)

(52) U.S. Cl.
USPC ........................................................ 307/130

(58) Field of Classification Search
USPC ...................... 307/116, 125, 130, 139, 140
See application file for complete search history.

(56) References Cited

U.S. PATENT DOCUMENTS

| | | | |
|---|---|---|---|
| 5,877,638 A * | 3/1999 | Lin ............................... | 327/108 |
| 6,118,675 A | 9/2000 | Lionetto et al. | |
| 7,265,518 B2 * | 9/2007 | Lee et al. ....................... | 320/134 |
| 7,647,068 B2 * | 1/2010 | Hong et al. ................ | 455/550.1 |
| 2007/0002661 A1 * | 1/2007 | Chu et al. ....................... | 365/226 |

FOREIGN PATENT DOCUMENTS

| CN | 1862902 A | 11/2006 |
|---|---|---|
| CN | 101562393 A | 10/2009 |

* cited by examiner

*Primary Examiner* — Rexford Barnie
*Assistant Examiner* — Rasem Mourad
(74) *Attorney, Agent, or Firm* — CKC & Partners Co., Ltd.

(57) ABSTRACT

A DC voltage supply apparatus including a voltage detection unit, an enable signal processing unit, a latch unit, a control unit and a voltage transforming unit is provided. The voltage detection unit receives and detects a DC input voltage to generate an input voltage state signal. The enable signal processing unit receives the input voltage state signal and an enable signal, and determines a state of the enable signal according to the input voltage state signal. When the enable signal is ineffective, the latch unit latches the enable signal to keep an ineffective state. The control unit receives the enable signal, and generates a control signal. When the control signal is effective, the voltage transforming unit receives the DC input voltage and transforms the DC input voltage into a DC output voltage. When the control signal is ineffective, the voltage transforming unit stops receiving the DC input voltage.

13 Claims, 3 Drawing Sheets

DIRECT CURRENT VOLTAGE SUPPLY APPARATUS

CROSS-REFERENCE TO RELATED APPLICATION

This application claims the priority benefit of Taiwan application serial no. 99141528, filed on Nov. 30, 2010. The entirety of the above-mentioned patent application is hereby incorporated by reference herein and made a part of this specification.

BACKGROUND

1. Field of the Invention

The invention relates to a direct current voltage supply apparatus. Particularly, the invention relates to a direct current voltage supply apparatus capable of cutting off a direct current (DC) power supply when a DC voltage is unstable.

2. Description of Related Art

Generally, a power supply is used to supply an operating voltage for a server system. The current power supply generally receives an alternating current (AC) voltage of 100V-230V first, and a transformer inside the power supply transforms the AC voltage into a direct current (DC) voltage (for example, 12V) to serve as the operating voltage of the server system. In this case, protection measures of the 12V DC voltage are all built in the power supply.

However, in view of a developing trend, the operating voltage of the server system is no longer provided by the AC voltage, but is directly provided by the DC voltage (for example, 12V) supplied by an end client. In this case, the server system cannot use the power supply, and the power supply is replaced by a DC board. However, the DC board is still required to have all of the protection measures (i.e. over voltage protection (OVP) and under voltage protection (UVP)) as that of the power supply. Therefore, how to achieve the OVP and the UVP of the DC board as that of the power supply is an important issue to be researched and developed.

SUMMARY OF THE INVENTION

The invention provides a direct current (DC) voltage supply apparatus including a voltage detection unit, an enable signal processing unit, a latch unit, a control unit and a voltage transforming unit. The voltage detection unit receives and detects a DC input voltage to generate an input voltage state signal, where the input voltage state signal indicates a stable state of the DC input voltage. The enable signal processing unit is coupled to the voltage detection unit, and receives the input voltage state signal and an enable signal, and determines a state of the enable signal according to the input voltage state signal, where when the DC input voltage is stable, the enable signal is effective, and when the DC input voltage is unstable, the enable signal is ineffective. The latch unit is coupled to the enable signal processing unit, and when the enable signal is ineffective, the latch unit latches the enable signal to keep an ineffective state. The control unit is coupled to the enable signal processing unit and the latch unit, and receives the enable signal, and generates a control signal accordingly. When the enable signal is effective, the control signal is effective, and when the enable signal is ineffective, the control signal is ineffective. The voltage transforming unit is coupled to the control unit, and when the control signal is effective, the voltage transforming unit receives the DC input voltage and transforms the DC input voltage into a DC output voltage for outputting. When the control signal is ineffective, the voltage transforming unit stops receiving the DC input voltage.

In an embodiment of the invention, the voltage detection unit includes a voltage dividing circuit and a comparator. The voltage dividing circuit receives the DC input voltage, and divides the DC input voltage to generate a voltage dividing signal. The comparator is coupled to the voltage dividing circuit, and receives and compares the voltage dividing signal with a first reference voltage signal to generate the input voltage state signal.

In an embodiment of the invention, the voltage dividing circuit includes a first resistor and a second resistor. A first end of the first resistor receives the DC input voltage, and a second end of the first resistor generates the voltage dividing signal. A first end of the second resistor is coupled to the second end of the first resistor, and a second end thereof is coupled to ground.

In an embodiment of the invention, a positive input terminal of the comparator receives the voltage dividing signal, and a negative input terminal of the comparator receives the first reference voltage signal.

In an embodiment of the invention, a positive input terminal of the comparator receives the first reference voltage signal, and a negative input terminal of the comparator receives the voltage dividing signal.

In an embodiment of the invention, the enable signal processing unit includes a first transistor and a voltage pull-up circuit. A gate of the first transistor receives the input voltage state signal, a source of the first transistor is coupled to the ground. The voltage pull-up circuit is coupled to a drain of the first transistor, where when the DC input voltage is stable, the first transistor is not conducted, so that the enable signal is effective, and when the DC input voltage is unstable, the first transistor is conducted, so that the enable signal is ineffective.

In an embodiment of the invention, the voltage pull-up circuit includes a third resistor, a first capacitor and a fourth resistor. A first end of the third resistor is coupled to the DC input voltage, and a second end of the third resistor is coupled to the drain of the first transistor and receives the enable signal. A first end of the first capacitor is coupled to the second end of the third resistor, and a second end of the first capacitor is coupled to the ground. A first end of the fourth resistor is coupled to the second end of the third resistor, and a second end of the fourth resistor is coupled to the ground.

In an embodiment of the invention, the latch unit includes a delay unit and a first switch unit. An input terminal of the delay unit receives a second reference voltage signal, and delays the second reference voltage signal to generate a delay voltage signal. The first switch unit is coupled to the delay unit, and receives the delay voltage signal and the enable signal, and determines whether or not to latch the enable signal, where when the enable signal is ineffective, the first switch unit is activated to latch the enable signal to keep the ineffective state, and when the enable signal is effective, the first switch is not activated, and the latch unit does not operate.

In an embodiment of the invention, the delay unit includes a fifth resistor and a second capacitor. A first end of the fifth resistor receives the second reference voltage signal, and a second end of the fifth resistor generates the delay voltage signal. A first end of the second capacitor is coupled to the second end of the fifth resistor, and a second end of the second capacitor is coupled to the ground.

In an embodiment of the invention, the first switch unit includes a second transistor and a third transistor. A drain of the second transistor receives the delay voltage signal, a source of the second transistor is coupled to the ground, and a gate of the second transistor receives the enable signal. A gate of the third transistor is coupled to the drain of the second transistor, a drain of the third transistor is coupled to the gate of the second transistor, and a source of the third transistor is coupled to the ground.

In an embodiment of the invention, the voltage transforming unit includes a second switch unit and a voltage transforming circuit. The second switch unit is coupled to the control unit. When the control signal is effective, the second switch unit is conducted, so that the DC input voltage is transmitted through the second switch unit. When the control signal is ineffective, the second switch unit is not conducted, so that the voltage transforming unit stops receiving the DC input voltage. The voltage transforming circuit is coupled to the second switch unit, and receives the DC input voltage when the second switch unit is conducted, and transforms the DC input voltage into the DC output voltage for outputting.

In an embodiment of the invention, the second switch unit includes a fourth transistor. A gate of the fourth transistor receives the control signal, a drain of the fourth transistor receives the DC input voltage, and the fourth transistor determines whether or not to transmit the DC input voltage through a source thereof according to a state of the control signal.

In an embodiment of the invention, the DC voltage supply apparatus further includes an enable signal generator. The enable signal generator is coupled to the enable signal processing unit for generating the enable signal.

According to the above descriptions, in the invention, the voltage detection unit detects the DC input voltage to generate the input voltage state signal for indicating a stable state of the DC input voltage. Then, the enable signal processing unit determines a state of the enable signal according to the input voltage state signal. Thereafter, when the enable signal is ineffective, the latch unit latches the enable signal to keep an ineffective state, so that a logic level the enable signal is not changed. Then, the control unit generates the control signal according to the enable signal to control the voltage transforming unit, so as to determine whether or not to receive and transform the DC input voltage into the DC output voltage to a main circuit of a server. In this way, when the DC input voltage is unstable, the DC voltage supply apparatus stops providing power to the main circuit of the server, so as to avoid a misoperation of the main circuit caused by unstable power, and effectively achieve a protection effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
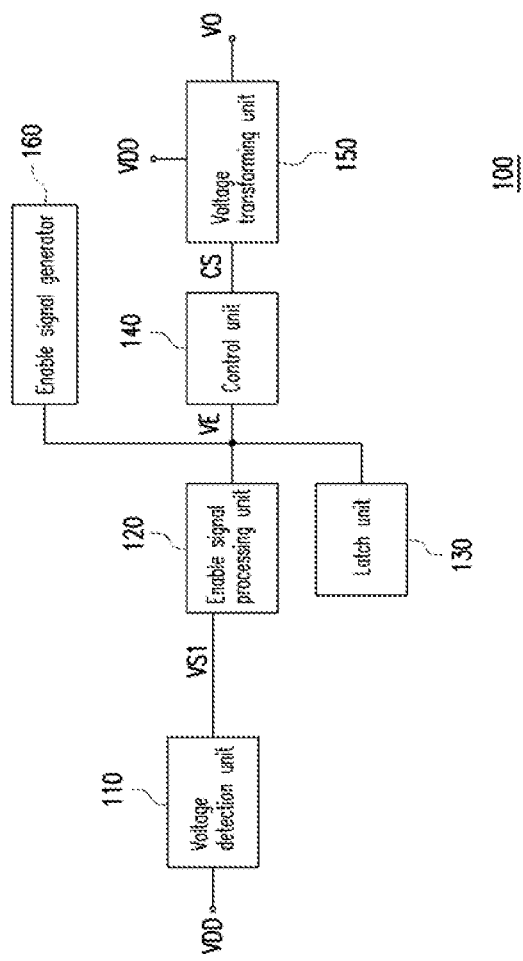
FIG. 1 is a block diagram illustrating a direct current (DC) voltage supply apparatus according to an embodiment of the invention.

FIG. 1 is a block diagram illustrating a direct current (DC) voltage supply apparatus according to an embodiment of the invention. The DC voltage supply apparatus of the present embodiment is adapted to a server. Referring to FIG. 1, the DC voltage supply apparatus 100 includes a voltage detection unit 110, an enable signal processing unit 120, a latch unit 130, a control unit 140 and a voltage transforming unit 150.

The voltage detection unit 110 receives and detects a DC input voltage VDD to generate an input voltage state signal VS1, where the input voltage state signal VS1 indicates a stable state of the DC input voltage VDD. The enable signal processing unit 120 is coupled to the voltage detection unit 110, and receives the input voltage state signal VS1 and an enable signal VE, and determines a state of the enable signal VE according to the input voltage state signal VS1. For example, when the input voltage state signal VS1 has a low logic level "0", it represents that the DC input voltage VDD is in a stable state, and the enable signal processing unit 120 adjusts the enable signal to a high logic level "1", so that the enable signal VE is effective. When the input voltage state signal VS1 has a low logic level "1", it that represents that the DC input voltage VDD is in an unstable state, and the enable signal processing unit 120 adjusts the enable signal to the low logic level "0", so that the enable signal VE is ineffective.

The latch unit 130 is coupled to the enable signal processing unit 120, and when the enable signal VE is ineffective, the latch unit 130 latches the enable signal VE to keep an ineffective state of the enable signal VE. The control unit 140 is coupled to the enable signal processing unit 120 and the latch unit 130, and receives the enable signal VE and generates a control signal CS accordingly. For example, when the enable signal VE is effective, i.e. the enable signal VE has the high logic level "1", the control unit 140 adjusts the control signal CS to the high logic level "1", so that the control signal CS is effective and is output. When the enable signal VE is ineffective, i.e. the enable signal VE has the low logic level "0", the control unit 140 adjusts the control signal CS to the low logic level "0", so that the control signal CS is ineffective and is output. In the present embodiment, the control unit 140 is, for example, an ISL6115 chip.

The voltage transforming unit 150 is coupled to the control unit 140, and determines whether or not to provide the DC input voltage VDD to serve as a DC output voltage VO according to the control signal CS. For example, when the control signal CS has the high logic level "1", i.e. the control signal CS is effective, the voltage transforming unit 150 receives the DC input voltage VDD and transforms the DC input voltage VDD into the DC output voltage VO for outputting. When the control signal CS has the low logic level "0", i.e. the control signal CS is ineffective, the voltage transforming unit 150 stops receiving the DC input voltage VDD.

In this way, the DC voltage supply apparatus 100 of the present embodiment can stop providing power to a main circuit of the server when the DC input voltage VDD is in the unstable state, so as to avoid a misoperation of the main circuit caused by the unstable power, and effectively achieve a protection effect.

Moreover, the DC voltage supply apparatus 100 of the present embodiment further includes an enable signal generator 160. The enable signal generator 160 is coupled to the enable signal processing unit 120 for generating the enable signal VE to the enable signal processing unit 120. The enable signal VE is, for example, generated by the enable signal generator 160 when a motherboard (not shown) is connected to the DC voltage supply apparatus 100, or when the motherboard is booted, the enable signal generator 160 generates the enable signal VE according to a booting signal.

Detailed circuit structure of the DC voltage supply apparatus 100 is introduced below.

Figure 2:
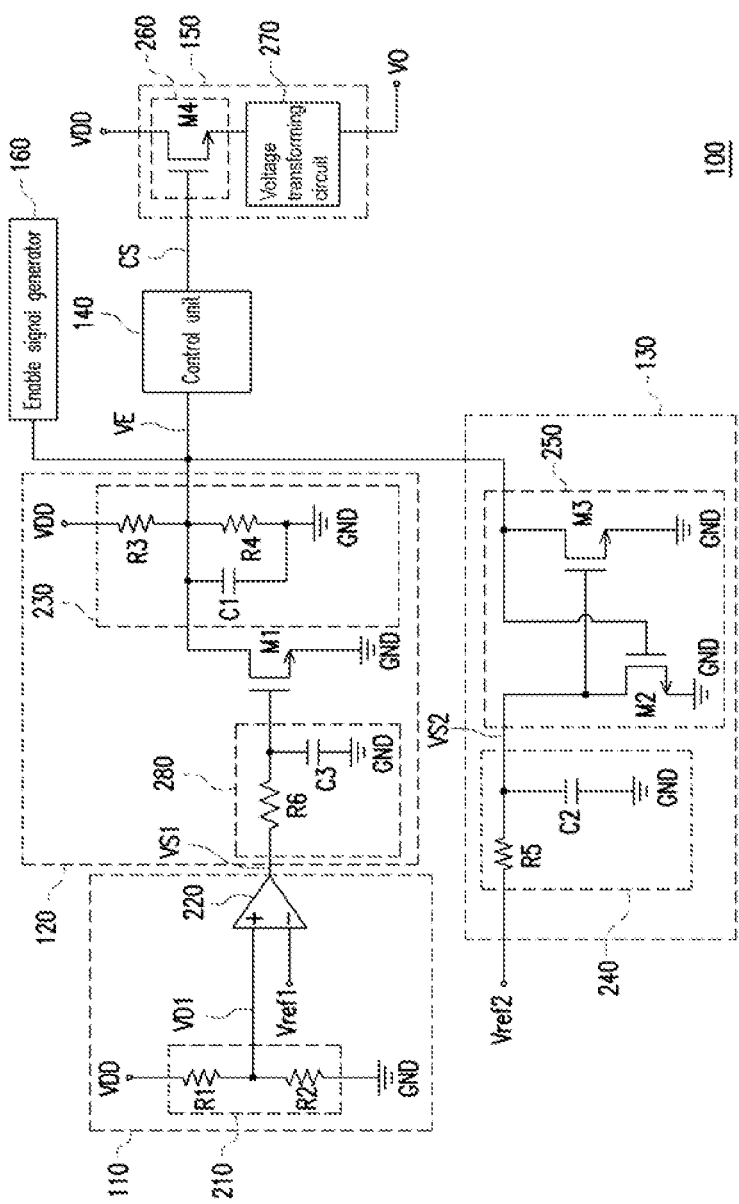
FIG. 2 is a detailed circuit diagram of the DC voltage supply apparatus of FIG. 1.

FIG. 2 is a detailed circuit diagram of the DC voltage supply apparatus 100 of FIG. 1. Referring to FIG. 2, the voltage detection unit 110 includes a voltage dividing circuit 210 and a comparator 220. The voltage dividing circuit 210 receives the DC input voltage VDD, and divides the DC input voltage VDD to generate a voltage dividing signal VD1. The voltage dividing circuit 210 includes a resistor R1 and a resistor R2. A first end of the resistor R1 receives the DC input voltage VDD, and a second end of the resistor R1 generates the voltage dividing signal VD1. A first end of the resistor R2 is coupled to the second end of the resistor R1, and a second end of the resistor R2 is coupled to ground. Namely, the voltage dividing circuit 210 divides the DC input voltage VDD through the resistors R1 and R2 to generate the voltage dividing signal VD1.

The comparator 220 is coupled to the voltage dividing circuit 210, and receives and compares the voltage dividing signal VD1 with a reference voltage signal Vref1 to generate the input voltage state signal VS1. In the present embodiment, a first input terminal (for example, a positive input terminal) of the comparator 220 receives the voltage dividing signal VD1, a second input terminal (for example, a negative input terminal) of the comparator 220 receives the reference voltage signal Vref1, and an output terminal of the comparator 220 generates the input voltage state signal VS1.

The enable signal processing unit 120 includes a transistor M1 and a voltage pull-up circuit 230. A gate of the transistor M1 receives the input voltage state signal VD1, a source of the transistor M1 is coupled to the ground GND. The transistor M1 can be an N-channel metal oxide semiconductor (NMOS) transistor.

The voltage pull-up circuit 230 is coupled to a drain of the transistor M1, and receives the enable signal VE, and determines the state of the enable signal VE according to whether or not the transistor M1 is conducted. For example, when the DC input voltage VDD is in the stable state, i.e. the input voltage state signal VS1 has the low logic level "0" and is transmitted to the gate of the transistor M1, the transistor M1 is not conducted, and the voltage pull-up circuit 230 may keep the enable signal VE in the high logic level "1", so that the enable signal VE is effective. When the DC input voltage is in the unstable state, i.e. the input voltage state signal VS1 has the high logic level "1" and is transmitted to the gate of the transistor M1, the transistor M1 is conducted. Now, since the transistor M1 is conducted, the enable signal VE is pulled down to the low logic level "0", so that the enable signal VE is ineffective.

Moreover, the voltage pull-up circuit 230 includes resistors R3 and R4 and a capacitor C1. A first end of the resistor R3 is coupled to the DC input voltage VDD, and a second end of the resistor R3 is coupled to the drain of the transistor M1 and receives the enable signal VE. A first end of the capacitor C1 is coupled to the second end of the resistor R3, and a second end of the capacitor C1 is coupled to the ground GND. A first end of the resistor R4 is coupled to the second end of the resistor R3, and a second end of the resistor R4 is coupled to the ground GND.

The latch unit 130 includes a delay unit 240 and a switch unit 250. An input terminal of the delay unit 240 receives a reference voltage signal Vref2, and delays the reference voltage signal Vref2 to generate a delay voltage signal VS2. Moreover, the delay unit 240 includes a resistor R5 and a capacitor C2. A first end of the resistor R5 receives the reference voltage signal Vref2, and a second end of the resistor R5 generates the delay voltage signal VS2. A first end of the capacitor C2 is coupled to the second end of the resistor R5, and a second end of the capacitor C2 is coupled to the ground GND.

The switch unit 250 is coupled to the delay unit 240, and receives the delay voltage signal VS2 and the enable signal VE, and determines whether or not to latch the enable signal VE, where when the enable signal VE is ineffective, the switch unit 250 is activated to latch the enable signal VE to keep the ineffective state thereof. Moreover, the switch unit 250 includes a transistor M2 and a transistor M3. A drain of the transistor M2 receives the delay voltage signal VS2, a source of the transistor M2 is coupled to the ground GND, and a gate of the transistor M2 receives the enable signal VE. A gate of the transistor M3 is coupled to the drain of the transistor M2, a drain of the transistor M3 is coupled to the gate of the transistor M2, and a source of the transistor M3 is coupled to the ground GND.

The voltage transforming unit 150 includes a switch unit 260 and a voltage transforming circuit 270. The switch unit 260 is coupled to the control unit 140. When the control signal CS is effective, the switch unit 260 is conducted, so that the DC input voltage VDD is transmitted through the switch unit 260. When the control signal CS is ineffective, the switch unit 260 is not conducted, so that the voltage transforming unit 150 stops receiving the DC input voltage VDD. The voltage transforming circuit 270 is coupled to the switch unit 260, and receives the DC input voltage VDD when the switch unit 260 is conducted, and transforms the DC input voltage VDD into the DC output voltage VO for outputting.

Moreover, the switch unit 260 includes a transistor M4. A gate of the transistor M4 receives the control signal CS, and a drain of the transistor M4 receives the DC input voltage VDD. The transistor M4 determines whether or not to transmit the DC input voltage VDD through a source thereof according to the state of the control signal CS.

In view of a whole circuit operation, first, the DC input voltage VDD is divided by the resistors R1 and R2 of the voltage dividing circuit 210 to generate the voltage dividing signal VD1, and the voltage dividing signal VD1 is input to the first input terminal (the positive input terminal) of the comparator 220. Then, when the first input terminal (the positive input terminal) of the comparator 220 receives the voltage dividing signal VD1, the voltage dividing signal VD1 is compared to the reference voltage signal Vref1 received by the second input terminal (the negative input terminal) of the comparator 220.

Generally, when the DC input voltage VDD is stable (i.e. none over voltage state is occurred), the voltage dividing signal VD1 generated by the voltage dividing circuit 210 is less than the reference voltage signal Vref1. Therefore, when the voltage of the voltage dividing signal VD1 is less than the reference voltage signal Vref1, the output terminal of the comparator 220 generates the input voltage state signal VS1 with the low logic level "0". Then, the input voltage state signal VS1 with the low logic level "0" is input to the gate of the transistor M1 of the enable signal processing unit 120, so that the transistor M1 is not conducted. Since the transistor M1 is not conducted, the voltage pull-up circuit 230 adjusts the received enable signal VE to the high logic level "1", and transmits it to the gate of the transistor M2 of the latch unit 130 and the control unit 140.

Since the reference voltage signal Vref2 is delayed by the delay unit 240, the enable signal VE with the high logic level "1" is transmitted to the gate of the transistor M2 earlier than the delay voltage signal VS2 generated by the delay unit 240, so that the transistor M2 is conducted. Since the transistor M2 is conducted, the gate of the transistor M3 is coupled to the ground GND, so that the transistor M3 is not conducted, and therefore the latch unit 130 does not function (i.e. the latch unit 130 does not operate). Therefore, the enable signal VE is still maintained to the high logic level "1", which represents that the enable signal VE is effective.

Then, when the control unit 140 receives the enable signal VE with the high logic level "1", the control unit 140 generates the control signal CS with the high logic level "1" to the gate of the transistor M4, so that the transistor M4 is conducted. Since the transistor M4 is conducted, the voltage transforming circuit 270 receives the DC input voltage VDD through the source of the transistor M4, and transforms the DC input voltage VDD into the DC output voltage VO for providing to the main circuit of the server for utilization.

Moreover, once the DC input voltage VDD is jittered, the voltage dividing signal VD1 is also jittered to generate an over voltage state. Therefore, when the voltage of the voltage dividing signal VD1 is greater than the reference voltage signal Vref1, the output terminal of the comparator 220 generates the input voltage state signal VS1 with the high logic level "1". Then, the input voltage state signal VS1 with the high logic level "1" is input to the gate of the transistor M1 of the enable signal processing unit 120, so that the transistor M1 is conducted. Since the transistor M1 is conducted, the ground potential is output through the transistor M1, so that the voltage pull-up circuit 230 adjusts the received enable signal VE to the low logic level "0", and transmits it to the gate of the transistor M2 of the latch unit 130 and the control unit 140.

Now, the gate of the transistor M2 receives the enable signal VE with the low logic level "0", so that the transistor M2 is not conducted. Since the transistor M2 is not conducted, the delay voltage signal VS2 generated by the delay unit 240 is transmitted to the gate of the transistor M3 to turn on the transistor M3, so that the latch unit 130 latches the enable signal VE as the low logic level "0" to maintain the ineffective state. Then, the control unit 140 receives the enable signal VE with the low logic level "0", and generates the control signal CS with the low logic level "0" to the gate of the transistor M4, so that the transistor M4 is not conducted. Since the transistor M4 is not conducted, the voltage transforming circuit 270 cannot receive the DC input voltage VDD through the transistor M4, so that the voltage transforming unit 150 stops receiving the DC input voltage VDD and cuts off the power supplied to the main circuit of the server. In this way, the DC voltage supply apparatus 100 can effectively latch the over voltage state when the DC input voltage VDD has the over voltage state, and cut off the power supplied to the main circuit, so as to achieve an effect of protecting the main circuit.

Moreover, in the present embodiment, the enable signal processing unit 120 further includes a filter circuit 280. The filter circuit 280 receives the input voltage state signal VS1 and filters the noise of the input voltage state signal VS1. The filter circuit 280 includes a resistor R6 and a capacitor C3, and a coupling relation thereof is as that shown in FIG. 2, which is not repeated.

Figure 3:
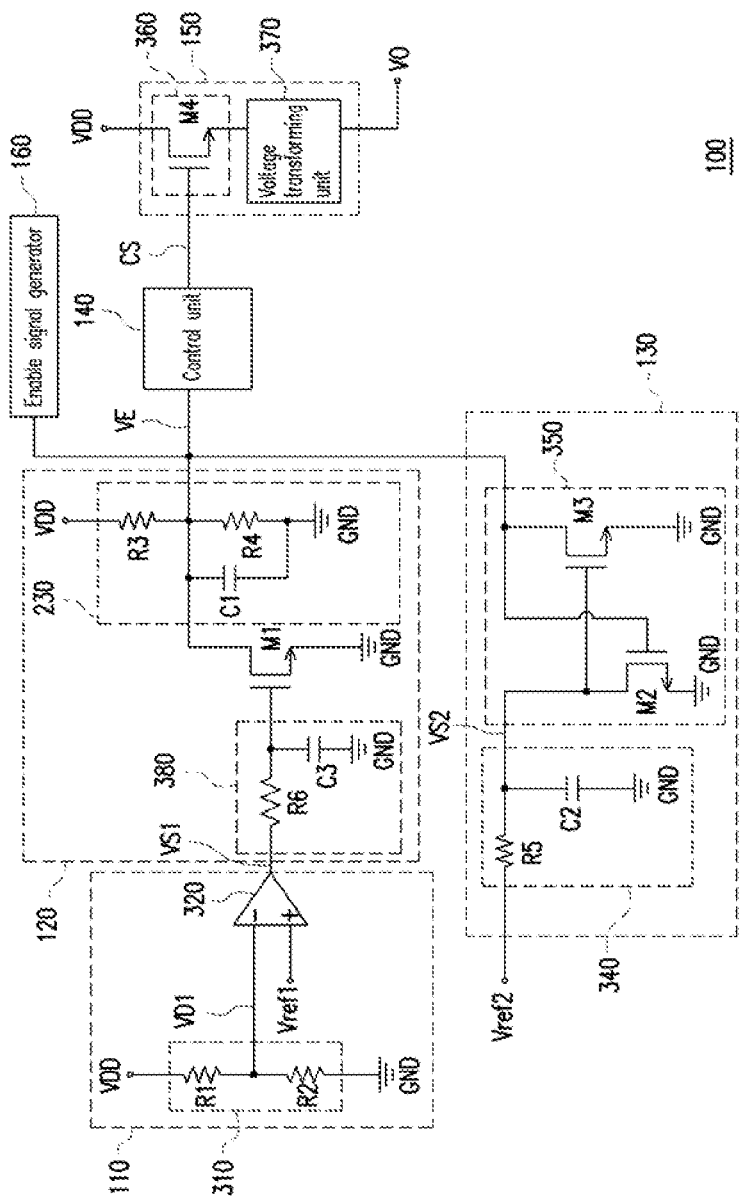
FIG. 3 is a detailed circuit diagram of another DC voltage supply apparatus of FIG. 1.

Moreover, FIG. 3 is a detailed circuit diagram of another DC voltage supply apparatus of FIG. 1. Implementations of the voltage detection unit 110, the enable signal processing unit 120, the latch unit 130, the control unit 140, the voltage transforming unit 150 and the enable signal generator 160 of FIG. 3 are as that of the voltage detection unit 110, the enable signal processing unit 120, the latch unit 130, the control unit 140, the voltage transforming unit 150 and the enable signal generator 160 of FIG. 2, so that detailed descriptions thereof are not repeated. A difference between FIG. 3 and FIG. 2 is that in FIG. 2, the first input terminal of the comparator 220 is the positive input terminal, and the second input terminal of the comparator 220 is the negative input terminal, while in FIG. 3, a first input terminal of a comparator 320 is the negative input terminal, and a second input terminal of the comparator 320 is the positive input terminal.

In view of a whole circuit operation, first, the DC input voltage VDD is divided by the resistors R1 and R2 of a voltage dividing circuit 310 to generate the voltage dividing signal VD1, and the voltage dividing signal VD1 is input to the first input terminal (the negative input terminal) of the comparator 320. Then, when the first input terminal (the negative input terminal) of the comparator 320 receives the voltage dividing signal VD1, the voltage dividing signal VD1 is compared to the reference voltage signal Vref1 received by the second input terminal (the positive input terminal) of the comparator 320.

Generally, when the DC input voltage VDD is stable (i.e. none under voltage state is occurred), the voltage dividing signal VD1 generated by the voltage dividing circuit 310 is greater than the reference voltage signal Vref1. Therefore, when voltage of the voltage dividing signal VD1 is greater than the reference voltage signal Vref1, the output terminal of the comparator 320 generates the input voltage state signal VS1 with the low logic level "0". Then, the input voltage state signal VS1 with the low logic level "0" is input to the gate of the transistor M1 of the enable signal processing unit 120, so that the transistor M1 is not conducted. Since the transistor M1 is not conducted, the voltage pull-up circuit 230 adjusts the received enable signal VE to the high logic level "1", and transmits it to the gate of the transistor M2 of the latch unit 130 and the control unit 140.

Since the reference voltage signal Vref2 is delayed by a delay unit 340, the enable signal VE with the high logic level "1" is transmitted to the gate of the transistor M2 earlier than the delay voltage signal VS2 generated by the delay unit 340, so that the transistor M2 is conducted. Since the transistor M2 is conducted, the gate of the transistor M3 is coupled to the ground GND, so that the transistor M3 is not conducted, and therefore the latch unit 130 does not function (i.e. the latch unit 130 does not operate). Therefore, the enable signal VE is still maintained to the high logic level "1", which represents that the enable signal VE is effective.

Then, when the control unit 140 receives the enable signal VE with the high logic level "1", the control unit 140 generates the control signal CS with the high logic level "1" to the gate of the transistor M4, so that the transistor M4 is conducted. Since the transistor M4 is conducted, a voltage transforming circuit 370 receives the DC input voltage VDD through the source of the transistor M4, and transforms the DC input voltage VDD into the DC output voltage VO for providing to the main circuit of the server for utilization.

Moreover, once the DC input voltage VDD is jittered, the voltage dividing signal VD1 is also jittered to generate an under voltage state. Therefore, when the voltage of the voltage dividing signal VD1 is less than the reference voltage signal Vref1, the output terminal of the comparator 320 generates the input voltage state signal VS1 with the high logic level "1". Then, the input voltage state signal VS1 with the high logic level "1" is input to the gate of the transistor M1 of the enable signal processing unit 120, so that the transistor M1 is conducted. Since the transistor M1 is conducted, the ground potential is output through the transistor M1, so that the voltage pull-up circuit 330 adjusts the received enable signal VE to the low logic level "0", and transmits it to the gate of the transistor M2 of the latch unit 130 and the control unit 140.

Now, the gate of the transistor M2 receives the enable signal VE with the low logic level "0", so that the transistor M2 is not conducted. Since the transistor M2 is not conducted, the delay voltage signal VS2 generated by the delay unit 340 is transmitted to the gate of the transistor M3 to turn on the transistor M3, so that the latch unit 130 latches the enable signal VE as the low logic level "0" to maintain the ineffective state. Then, the control unit 140 receives the enable signal VE with the low logic level "0", and generates the control signal CS with the low logic level "0" to the gate of the transistor M4, so that the transistor M4 is not conducted. Since the transistor M4 is not conducted, the voltage transforming circuit 370 cannot receive the DC input voltage VDD through the transistor M4, so that the voltage transforming unit 150 stops receiving the DC input voltage VDD and cuts off the power supplied to the main circuit of the server. In this way, the DC voltage supply apparatus 100 can effectively latch the under voltage state when the DC input voltage VDD has the under voltage state, and cut off the power supplied to the main circuit, so as to achieve the effect of protecting the main circuit.

In summary, in the invention, the voltage detection unit detects the DC input voltage to generate the input voltage state signal for indicating a stable state of the DC input voltage. Then, the enable signal processing unit determines a state of the enable signal according to the input voltage state signal. Thereafter, when the enable signal is ineffective, the latch unit latches the enable signal to keep the ineffective state, so that a logic level of the enable signal is not changed. Then, the control unit generates the control signal according to the enable signal to control the voltage transforming unit, so as to determine whether or not to receive and transform the DC input voltage into the DC output voltage to the main circuit of the server. In this way, when the DC input voltage is unstable (for example, the over voltage state or the under voltage state), the DC voltage supply apparatus stops providing power to the main circuit of the server, so as to avoid a misoperation of the main circuit caused by unstable power, and effectively achieve a protection effect.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A direct current (DC) voltage supply apparatus, comprising:
   a voltage detection unit, for receiving and detecting a DC input voltage to generate an input voltage state signal, wherein the input voltage state signal indicates a stable state of the DC input voltage;
   an enable signal processing unit, coupled to the voltage detection unit, for receiving the input voltage state signal and an enable signal, and determining a state of the enable signal according to the input voltage state signal, wherein when the DC input voltage is stable, the enable signal is effective, and when the DC input voltage is unstable, the enable signal is ineffective;
   a latch unit, coupled to the enable signal processing unit, wherein when the enable signal is ineffective, the latch unit latches the enable signal to keep an ineffective state;
   a control unit, coupled to the enable signal processing unit and the latch unit, for receiving the enable signal to generate a control signal, wherein when the enable signal is effective, the control signal is effective, and when the enable signal is ineffective, the control signal is ineffective; and
   a voltage transforming unit, coupled to the control unit, wherein when the control signal is effective, the voltage transforming unit receives the DC input voltage and transforms the DC input voltage into a DC output voltage for outputting, and when the control signal is ineffective, the voltage transforming unit stops receiving the DC input voltage.

2. The DC voltage supply apparatus as claimed in claim 1, wherein the voltage detection unit comprises:
   a voltage dividing circuit, for receiving the DC input voltage, and dividing the DC input voltage to generate a voltage dividing signal; and
   a comparator, coupled to the voltage dividing circuit, for receiving and comparing the voltage dividing signal with a first reference voltage signal to generate the input voltage state signal.

3. The DC voltage supply apparatus as claimed in claim 2, wherein the voltage dividing circuit comprises:
   a first resistor, having a first end receiving the DC input voltage, and a second end generating the voltage dividing signal; and
   a second resistor, having a first end coupled to the second end of the first resistor, and a second end coupled to ground.

4. The DC voltage supply apparatus as claimed in claim 2, wherein a positive input terminal of the comparator receives the voltage dividing signal, and a negative input terminal of the comparator receives the first reference voltage signal.

5. The DC voltage supply apparatus as claimed in claim 2, wherein a positive input terminal of the comparator receives the first reference voltage signal, and a negative input terminal of the comparator receives the voltage dividing signal.

6. The DC voltage supply apparatus as claimed in claim 1, wherein the enable signal processing unit comprises:
   a first transistor, having a gate receiving the input voltage state signal, a source coupled to the ground; and
   a voltage pull-up circuit, coupled to a drain of the first transistor, for receiving the enable signal, and determining the state of the enable signal according to whether the first transistor is conducted, wherein when the DC input voltage is stable, the first transistor is not conducted, so that the enable signal is effective, and when the DC input voltage is unstable, the first transistor is conducted, so that the enable signal is ineffective.

7. The DC voltage supply apparatus as claimed in claim 6, wherein the voltage pull-up circuit comprises:
   a third resistor, having a first end coupled to the DC input voltage, and a second end coupled to the drain of the first transistor and receiving the enable signal;
   a first capacitor, having a first end coupled to the second end of the third resistor, and a second end coupled to the ground; and
   a fourth resistor, having a first end coupled to the second end of the third resistor, and a second end coupled to the ground.

8. The DC voltage supply apparatus as claimed in claim 1, wherein the latch unit comprises:
   a delay unit, having an input terminal receiving a second reference voltage signal, and delaying the second reference voltage signal to generate a delay voltage signal;
   a first switch unit, coupled to the delay unit, for receiving the delay voltage signal and the enable signal, and determining whether or not to latch the enable signal, wherein when the enable signal is ineffective, the first switch unit is activated to latch the enable signal to keep the ineffective state, and when the enable signal is effective, the first switch is not activated, and the latch unit does not operate.

9. The DC voltage supply apparatus as claimed in claim 8, wherein the delay unit comprises:
- a fifth resistor, having a first end receiving the second reference voltage signal, and a second end generating the delay voltage signal; and
- a second capacitor, having a first end coupled to the second end of the fifth resistor, and a second end coupled to the ground.

10. The DC voltage supply apparatus as claimed in claim 8, wherein the first switch unit comprises:
- a second transistor, having a drain receiving the delay voltage signal, a source coupled to the ground, and a gate receiving the enable signal; and
- a third transistor, having a gate coupled to the drain of the second transistor, a drain coupled to the gate of the second transistor, and a source coupled to the ground.

11. The DC voltage supply apparatus as claimed in claim 1, wherein the voltage transforming unit comprises:
- a second switch unit, coupled to the control unit, wherein when the control signal is effective, the second switch unit is conducted, so that the DC input voltage is transmitted through the second switch unit, and when the control signal is ineffective, the second switch unit is not conducted, so that the voltage transforming unit stops receiving the DC input voltage; and
- a voltage transforming circuit, coupled to the second switch unit, for receiving the DC input voltage when the second switch unit is conducted, and transforming the DC input voltage into the DC output voltage for outputting.

12. The DC voltage supply apparatus as claimed in claim 11, wherein the second switch unit comprises:
- a fourth transistor, having a gate receiving the control signal, and a drain receiving the DC input voltage, wherein the fourth transistor determines whether or not to transmit the DC input voltage through a source thereof according to a state of the control signal.

13. The DC voltage supply apparatus as claimed in claim 1, further comprising:
- an enable signal generator, coupled to the enable signal processing unit, for generating the enable signal.

\* \* \* \* \*